United States Patent [19]

Tsukimoto et al.

[11] Patent Number: 5,387,835
[45] Date of Patent: Feb. 7, 1995

[54] VIBRATION DRIVEN MOTOR

[75] Inventors: Takayuki Tsukimoto, Fujisawa; Shinichi Koreeda, Kawasaki, both of Japan

[73] Assignee: Canon Kabushiki Kaisha, Tokyo, Japan

[21] Appl. No.: 259,159

[22] Filed: Jun. 13, 1994

Related U.S. Application Data

[63] Continuation of Ser. No. 6,781, Jan. 21, 1993, abandoned.

[30] Foreign Application Priority Data

Jan. 23, 1992 [JP] Japan .................. 4-010114

[51] Int. Cl.⁶ .............................................. H01L 41/09
[52] U.S. Cl. ............................................................ 310/323
[58] Field of Search ..................... 310/323, 325, 328

[56] References Cited

U.S. PATENT DOCUMENTS

| | | | |
|---|---|---|---|
| 4,634,917 | 1/1987 | Dvorsky et al. | 310/328 |
| 4,642,509 | 2/1987 | Kumada | 310/323 |
| 4,812,697 | 3/1989 | Mishiro | 310/323 |
| 4,965,482 | 10/1990 | Ohnishi et al. | 310/323 |
| 5,231,325 | 7/1993 | Tamai et al. | 310/323 |

FOREIGN PATENT DOCUMENTS 0469883 2/1992 European Pat. Off. ...... H01L 41/09

*Primary Examiner*—Thomas M. Dougherty
*Attorney, Agent, or Firm*—Fitzpatrick, Cella, Harper & Scinto

[57] ABSTRACT

In a vibration driven motor or actuator, which has members for generating a first bending vibration and a second bending vibration in a direction different from the first bending vibration therein, and in which a combined vibration of the first bending vibration and the second bending vibration is caused, rigidities in two directions of the vibration member are set to be equal to or substantially equal to each other.

16 Claims, 6 Drawing Sheets

VIBRATION DRIVEN MOTOR

This application is a continuation of application Ser. No. 08/006,781 filed Jan. 21, 1993 now abandoned.

BACKGROUND OF THE INVENTION

1. Field of the Invention

The present invention relates to a bar-shaped vibration driven motor or actuator and, more particularly, to a bar-shaped vibration driven motor suitable for use in optical equipment such as cameras, and OA equipment such as printers.

2. Related Background Art

A bar-shaped vibration driven motor is basically constituted by a bar-shaped vibration member 1, and a rotor 2 contacting the end face of the vibration member 1, as shown in FIG. 2. When a positional phase difference among piezo-electric elements 1b11, 1b12, 1b21, and 1b22 of the vibration member 1, and a temporal phase difference of an applied AC voltage for an ultrasonic wave are properly selected, surface portions of the end face, which serves as the driving surface of the vibration member 1, are caused to follow a circular or elliptic motion, thereby rotating the rotor 2 contacting the driving surface.

In the vibration member, the driving piezo-electric elements 1b11, 1b12, 1b21, and 1b22, and a vibration detection piezo-electric element 1b3 are arranged between columnar vibration member structural bodies 1a1 and 1a2, which are formed of a material such as metals (e.g., Bs, SUS, aluminum, and the like) causing less vibration attenuation. Electrode plates 1c3 to 1c6 are arranged between each pair of adjacent piezo-electric elements. A fastening bolt 3 having a male screw thread is inserted from the side of the vibration member structural body 1a2, and is threadably engaged with a female screw portion of the vibration member structural body 1a2 to clamp and fix the piezo-electric elements therebetween, thus constituting an integrated vibration member.

The rotor 2 is press contacted to the driving surface of the vibration member 1 via a spring case 5a by the biasing force of a compression spring 5 so as to obtain a frictional force. A rotary output member 6 frictionally contacts the spring case 5a. The member 6 has a gear portion on its outer circumferential surface, and is meshed with a gear (not shown) to transmit the rotational force of the rotor 2 to an external mechanism. The rotary output member 6 has a bearing 7.

Therefore, when the driving surface of the vibration member 1 makes a circular or elliptic motion, since the rotor 2 contacts near the peaks of the locus of, e.g., the elliptic motion, it is frictionally driven at a speed substantially proportional to the tangential speed. In order to increase the rotational speed of the motor, the vibration amplitude on the driving surface must be increased.

Most of the energy losses in the vibration member are internal frictional losses caused by strain in the vibration member caused by the vibration, and depend on the total sum of the strains.

For this reason, in order to increase the rotational speed of the motor, and to reduce the energy losses, it is desirable to increase the vibration amplitude of only a portion of the vibration member near the contact portion.

Thus, the present applicant has proposed a vibration member in which a circumferential groove 1d is formed in the vibration member 1 so as to increase the vibration amplitude of only a portion of the vibration member near the contact portion.

FIGS. 3A and 3B show radial displacement distributions of the shaft portion of the vibration member depending on the presence/absence of a circumferential groove 1d of the vibration member 1. FIG. 3A shows the case of a vibration member having no circumferential groove 1d, and FIG. 3B shows the case of a vibration member having a circumferential groove 1d. As can be seen from FIG. 3B, in the vibration member having a circumferential groove 1d, the rigidity of the portion of the vibration member at the circumferential groove 1d is lowered, and a large displacement is obtained at the side of the contact portion with the rotor as the driving surface.

From this fact, if the vibration members of FIGS. 3A and 3B are designed to have the same displacement at the contact portion with the rotor, then the displacements in other portions of the vibration member shown in FIG. 3B are generally smaller than the corresponding portions of the vibration member shown in FIG. 3A. As a result, the total sum of strains, i.e., the internal loss in the vibration member can be reduced.

A bar-shaped vibration driven motor utilizes orthogonal bending natural vibrations in two directions (x- and y-directions) as the driving force.

Therefore, it is impossible to obtain large amplitudes in both directions unless the two natural frequencies are substantially equal to each other. In this case, the locus of the surface portions of the vibration member is considerably shifted from a circular motion, and undesirably becomes closer to a linear motion.

As a result, a high rotational speed cannot be obtained as a motor output, resulting in poor efficiency.

Note that the two natural frequencies can be originally matched with each other by design calculations.

However, in practice, the two natural frequencies have a difference (to be referred to as $\Delta f$ hereinafter) therebetween, and the difference varies depending on individual vibration members.

As a result, the motor performance varies depending on individual motors.

Upon examination of the cause for the variation, it has been found that when a screw portion 4 for clamping and fixing the upper and lower vibration member structural bodies 1a1 and 1a2 (see FIG. 2) is present near the circumferential groove 1d, the variation $\Delta f$ becomes large.

It is believed that the above-mentioned fact is caused by the presence of strong and weak meshing portions due to machining errors of the male and female screw portions. More specifically, this causes a nonuniform rigidity, and the natural frequencies have a difference therebetween depending on a rigidity difference in the x- and y-directions of the vibration member.

As can be seen from FIG. 3B, at the position of the circumferential groove 1d having a low rigidity, a change $(\theta_2-\theta_1)$ in inclination angle of a vibration mode is large, and a large strain occurs.

Therefore, the rigidity difference at this position tends to appear as a difference between the bending natural frequencies.

SUMMARY OF THE INVENTION

It is an object of the present invention to provide a vibration driven motor or actuator, which can solve the above-mentioned problems.

In order to achieve this object, according to one aspect of the present invention, there is provided a vibration driven motor, which comprises: a vibration member in which electro-mechanical energy conversion elements are clamped between elastic members, the elastic members are fastened and integrated by fastening means, and an AC voltage having a predetermined temporal phase difference is applied to the electro-mechanical energy conversion elements, thereby causing surface portions of a driving surface to follow a circular or elliptic motion upon synthesis of bending vibrations excited in different planes and a movable member press contacted to the driving surface of the vibration member, the motor frictionally driving the movable member by the circular or elliptic motion followed by the vibration member, wherein the elastic members of the vibration member are formed with an amplitude increasing portion for increasing a vibration amplitude by decreasing a rigidity, and the fastening means does not have a coupling member near the amplitude increasing portion.

According to another aspect of the present invention, in a vibration driven motor or actuator, which has a vibration member, including a portion for increasing an amplitude in a driving surface, for generating a vibration obtained by combining vibrations in two directions, rigidities in two directions of the vibration member are set to be equal to or substantially equal to each other.

According to still another aspect of the present invention, in a vibration driven motor or actuator, which has members for generating a first bending vibration and a second bending vibration in a direction different from the first bending vibration therein, and in which a combined vibration of the first bending vibration and the second bending vibration is caused, rigidities in two directions of the vibration member are set to be equal to or substantially equal to each other

BRIEF DESCRIPTION OF THE DRAWINGS

FIG. 1 is a sectional view showing a vibration driven motor or actuator according to a first embodiment of the present invention;

DESCRIPTION OF THE PREFERRED EMBODIMENTS

FIG. 1 is a sectional view showing a vibration driven motor or actuator according to the first embodiment of the present invention.

In FIG. 1, vibration member structural bodies 1a1 and 1a2 are formed of, e.g., a metal such as Bs, SUS, aluminum, or the like, which causes less attenuation. Electro-mechanical energy conversion elements 1b11, 1b12, 1b21, 1b22, and 1b3 adopt PZT in this embodiment. Electrode plates 1c1 to 1c6 are formed of a conductor such as Cu, and are used for applying an electric field to the PZT. These electrode plates are manufactured by press, etching, or the like.

Note that the electrode plates 1c1, 1c3, and 1c5 serve as ground electrodes, and their inner-diameter side portions are in contact with and electrically connected to a bolt 3 formed of, e.g., Fe. Therefore, only the ground electrode 1c1 is used as a ground power supply port.

The PZT elements 1b11 and 1b12 are paired, and excite one bending vibration. The PZT elements 1b21 and 1b22 are paired, and excite a bending vibration in a direction perpendicular to that of the bending vibration excited by the PZT elements 1b11 and 1b12.

The PZT element 1b3 is a sensor PZT element, and generates an electromotive voltage according to a strain between the electrodes 1c1 and 1c6. Therefore, an insulating sheet 1e formed of, e.g., polyimide, polytetrafluoroethylene (TEFLON), or the like is inserted between vibration member body 1a2 and bolt 3, so that the PZT element 1a2, which is in contact with and electrically connected to the electrode plate 1c6, is not electrically connected to the bolt 3 as a ground electrode. The above-mentioned components are integrally clamped and fixed using the bolt 3.

When the above-mentioned components are clamped and fixed by fastening the bolt, in order to obtain a constant axial force, a lubricant is applied between the bolt 3 and the insulating sheet 1e and between the insulating sheet 1e and the lower structural body 1a2 so as to reduce and stabilize the friction coefficients therebetween, whereby the axial pressure force can be controlled by the fastening torque of the bolt. At this time, a plurality of insulating sheets may be inserted, and a lubricant (e.g., grease) may be applied between these sheets, thus enhancing the effect.

Figure 7:
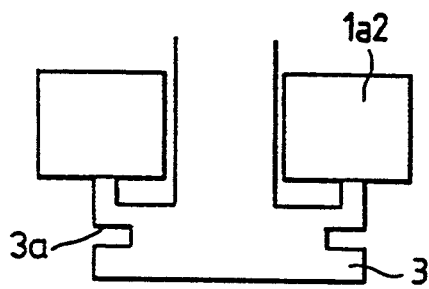
FIG. 7 is a schematic view showing a head portion structure of a fastening bolt.
Figure 8:
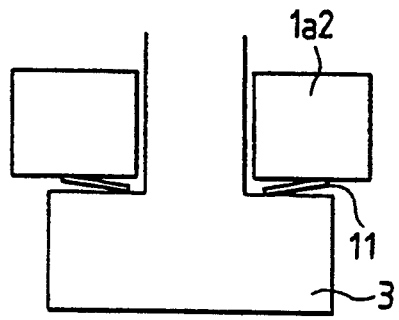
FIG. 8 is a schematic view showing a structure wherein a washer is arranged between a fastening bolt and the lower vibration member structural body.

Furthermore, in order to make the contact pressure between the bolt 3 and the structural body 1a2 uniform, a circumferential groove 3a may be formed in the lower surface of the bolt 3 to obtain a spring structure, as shown in FIG. 7, or a washer 11 or a belleville spring may be inserted, as shown in FIG. 8.

In order to make the friction coefficient and the meshing state of a screw portion 4 uniform, the screw portion 4 may be subjected to R tap or R dice machining. This machining is also effective for stabilizing the natural frequencies of the vibration member, as will be described later.

Furthermore, for example, a resin having a proper viscosity may be coated on the screw portion, so as to prevent movement of any metal piece dropped from the screw portion, which may cause short-circuiting of the electrodes in the vibration member upon insertion of the screw.

Moreover, for the purpose of preventing electrical leak and rust when a water component is attached to the outer side surfaces of the PZT elements, a coating agent of, e.g., a resin having a low water absorbency is preferably applied.

A rotor 2 is formed of aluminum, and is anodized to improve wear resistance. A spring case 5a formed of a metal such as Fe, Bs, aluminum, Zn, or the like is adhered to the rotor 2. Therefore, since the rotor 2 and the spring case 5a are integrated, the rigidity of the rotor 2 is improved, and deformation of the rotor 2 due to the pressure of a spring 5, the torque from a gear 6, or the like, is small. As a result, the rotor can always be in smooth contact with the vibration member.

A fixing flange 8 is formed by die-casting, e.g., Zn, and is coupled to the distal end of the bolt 3 by adhesion or press fitting. The flange 8 is fixed to a motor fixing member 14 by screws 13 via a rubber member 12. Note that the screws 13 are fixed to the flange 8 in a self-tapping manner. The rubber member 12 functions as a shock absorber for preventing the flange 8 from being deformed under the influence of the low surface precision of the fixing member 14, and also has a vibration insulating function of preventing a small vibration of the flange 8 from being transmitted to the fixing member 14.

In the bar-shaped vibration driven motor with the above-mentioned arrangement, the conventional arrangement undergoes the following improvements so as to solve the above-mentioned problems.

The bolt for clamping and fixing the vibration member structural bodies 1a1 and 1a2 is located at the side of the PZT elements so as to be separated from a circumferential groove 1d formed in the upper vibration member structural body 1a1.

Note that the threadable engaging portion between the bolt 3 and the vibration member structural body 1a1 need only be located even slightly on the PZT side of a lower surface 1a100 of the circumferential groove 1d. In other words, the threadable engaging portion need only be prevented from overlapping the lower surface 1a100.

Figure 3A:
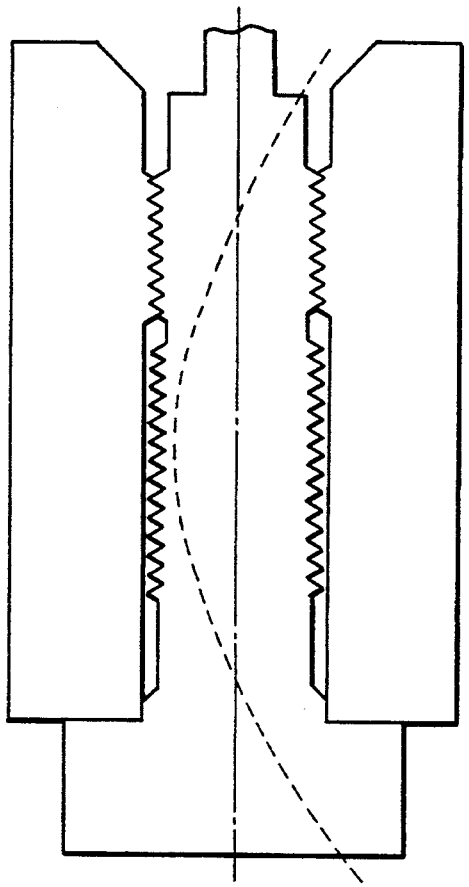
FIGS. 3A and 3B are views showing vibration modes of conventional vibration motors.
Figure 3B:
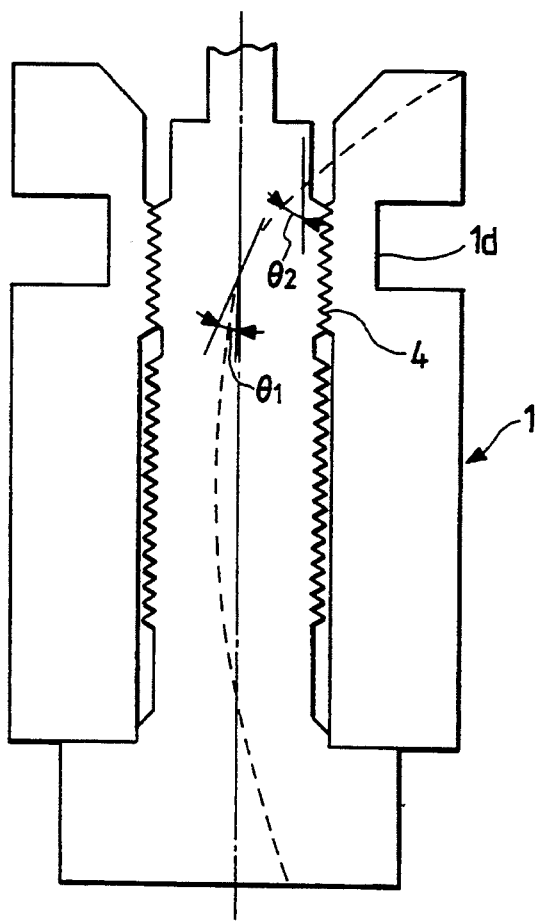

In the screw portion 4 in this case, as can be seen from the vibration mode shown in FIG. 3B, a change in inclination angle is small, and the influence of the nonuniform rigidity of the screw portion on $\Delta f$ is also reduced. As a result, a variation $\Delta f$ of the vibration member from a designed value (about zero) becomes small, and motor performance can be stabilized.

Figure 1A:
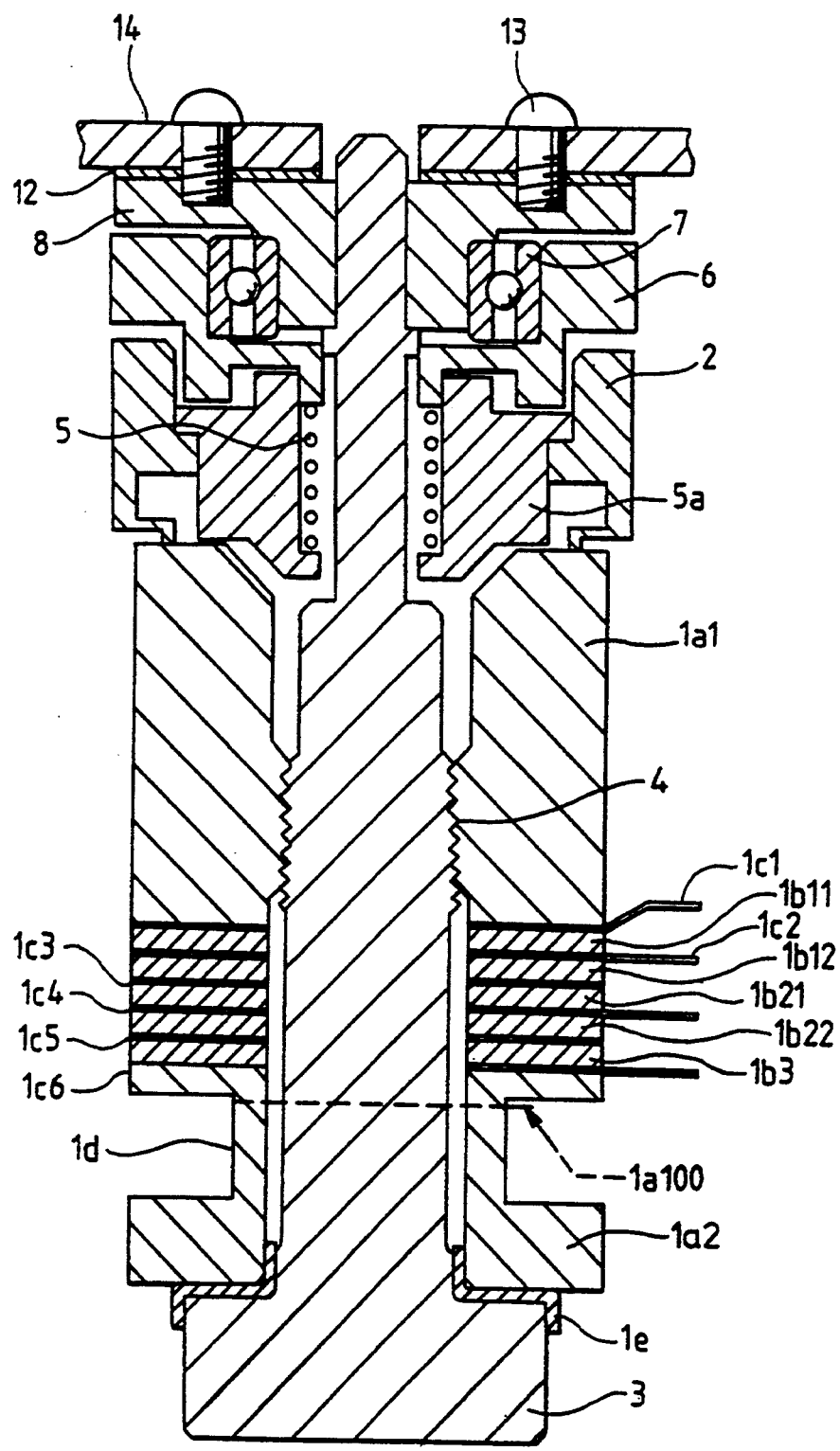
FIG. 1A is an alternative configuration of the embodiment of FIG. 1.
Figure 2:
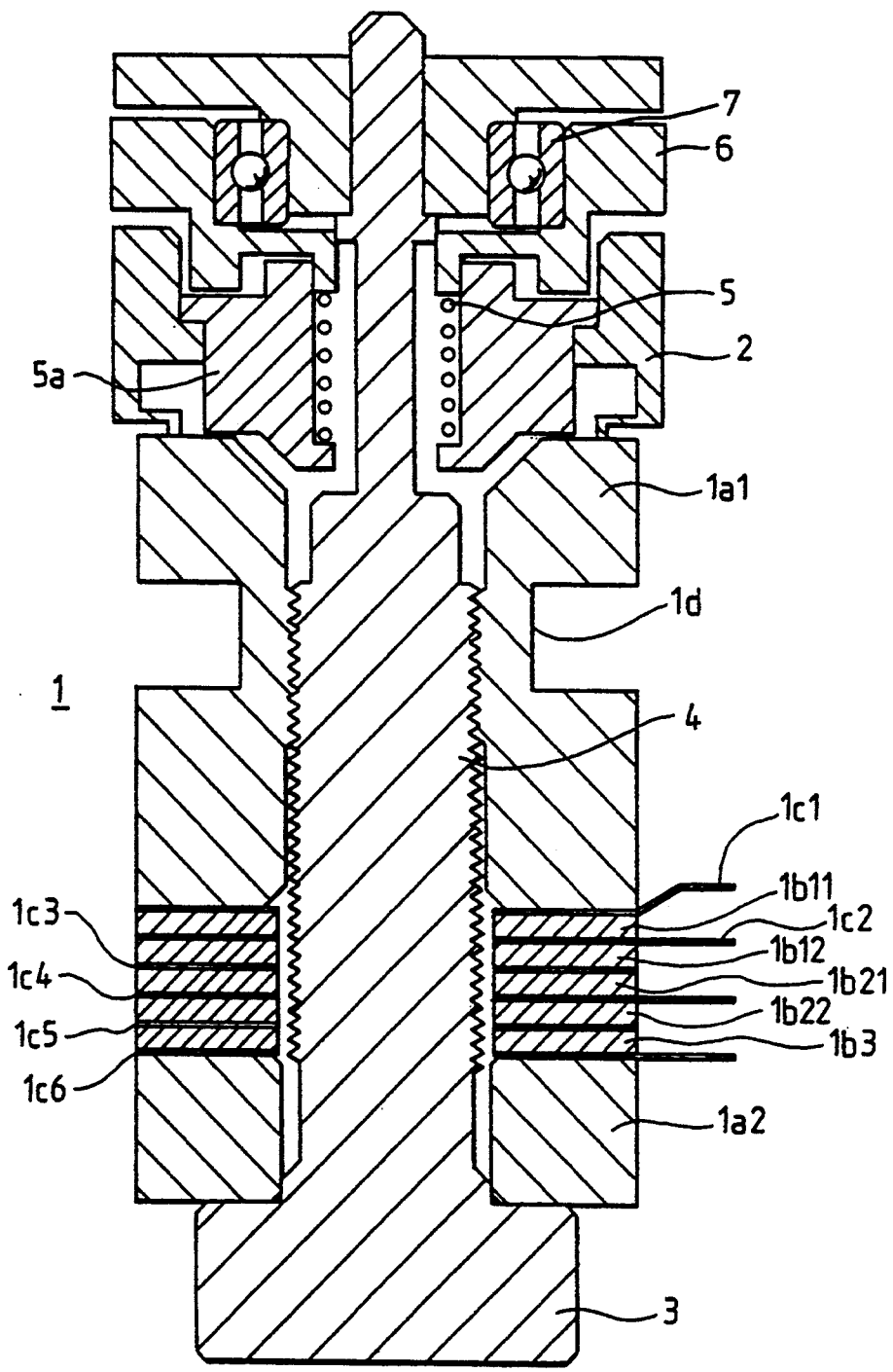
FIG. 2 is a sectional view showing a conventional vibration driven motor.

FIG. 1A illustrates an alternative configuration of the embodiment of FIG. 1, wherein a circumferencial groove 1d is located in vibration member structural body 1a2.

Figure 4:
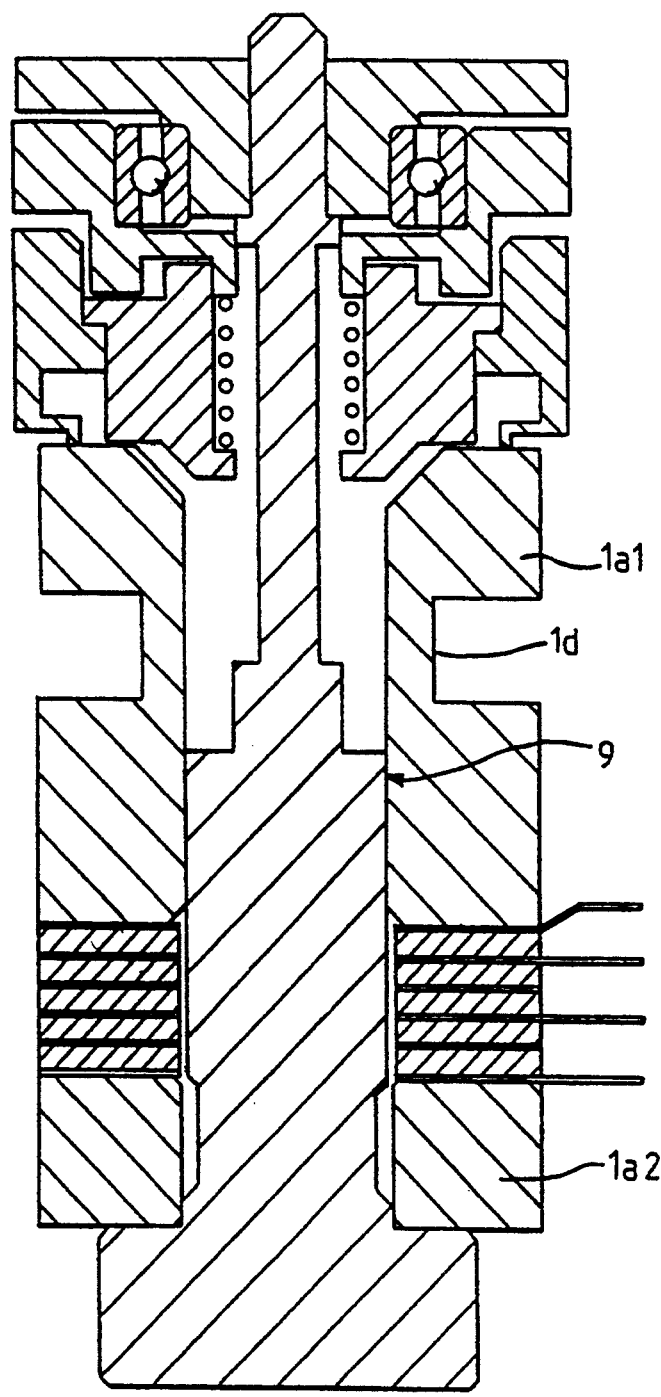
FIG. 4 is a sectional view showing a vibration driven motor according to a second embodiment of the present invention.

FIG. 4 shows the second embodiment of the present invention.

In this embodiment, upper and lower vibration member structural bodies 1a1 and 1a2 are clamped and fixed by adhesion or press fitting. A fixing portion 9 such as an adhesion layer or a press fitting portion is arranged not to overlap a circumferential groove portion 1d. Since the fixing portion 9 such as the adhesion layer or the press fitting portion is a factor of a nonuniform rigidity as in screw coupling, the influence of the nonuniform rigidity on $\Delta f$ can be eliminated by the structure of this embodiment.

Figure 5:
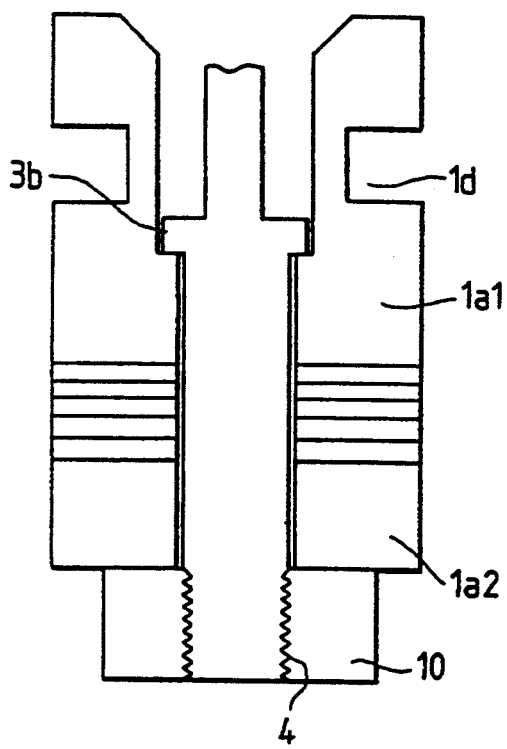
FIG. 5 is a schematic sectional view showing a vibration driven motor according to a third embodiment of the present invention.

FIG. 5 shows the third embodiment of the present invention.

In this embodiment, a stepped portion 3b is formed on a bolt 3 for fastening upper and lower vibration member structural bodies 1a1 and 1a2, and a male screw portion is formed on the lowermost portion of the bolt 3. The structural bodies 1a1 and 1a2 are fastened by the bolt 3 using a nut 10 outside the lower vibration member structural body 1a2. More specifically, a screw portion 4 is constituted by the male screw portion and the nut 10, and the position of this screw portion 4 corresponds to the free end of a vibration, resulting in a small change in inclination angle of the vibration mode, and a small strain.

Figure 6:
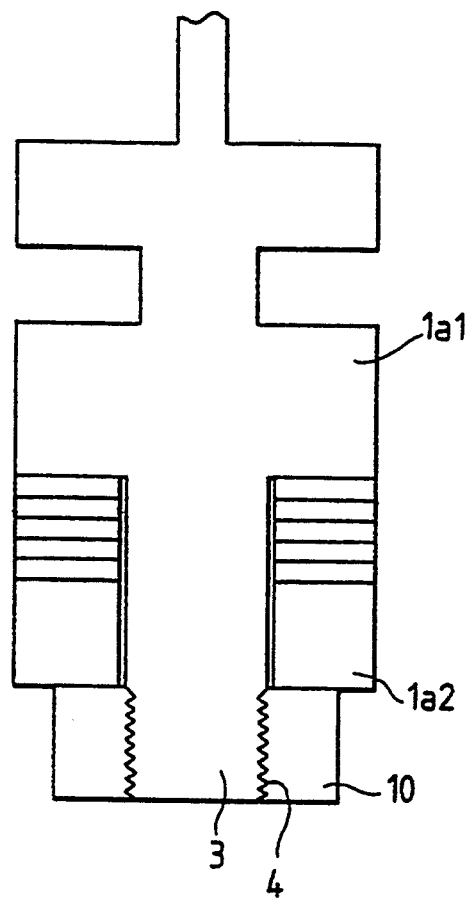
FIG. 6 is a schematic sectional view showing a vibration driven motor according to a fourth embodiment of the present invention.

As shown in FIG. 6, the bolt 3 may be formed integrally with the upper vibration member structural body 1a1, and the structural bodies may be fastened by threadably engaging the nut 10 with the male screw portion formed on the lower portion of the bolt 3 as in the embodiment shown in FIG. 5. Thus, the same effect as in the above embodiment can be obtained, and the number of parts can be reduced.

In each of the above embodiments, in consideration of the influence on rigidity of indefinite factors such as screw coupling, adhesion coupling, press fitting coupling, and the like, and thus on the natural frequencies, these factors are eliminated from a place where the strain is large. In general, since these factors also cause a large internal loss, they are preferably eliminated from the place where a strain is large, from this viewpoint as well.

Figure 9:
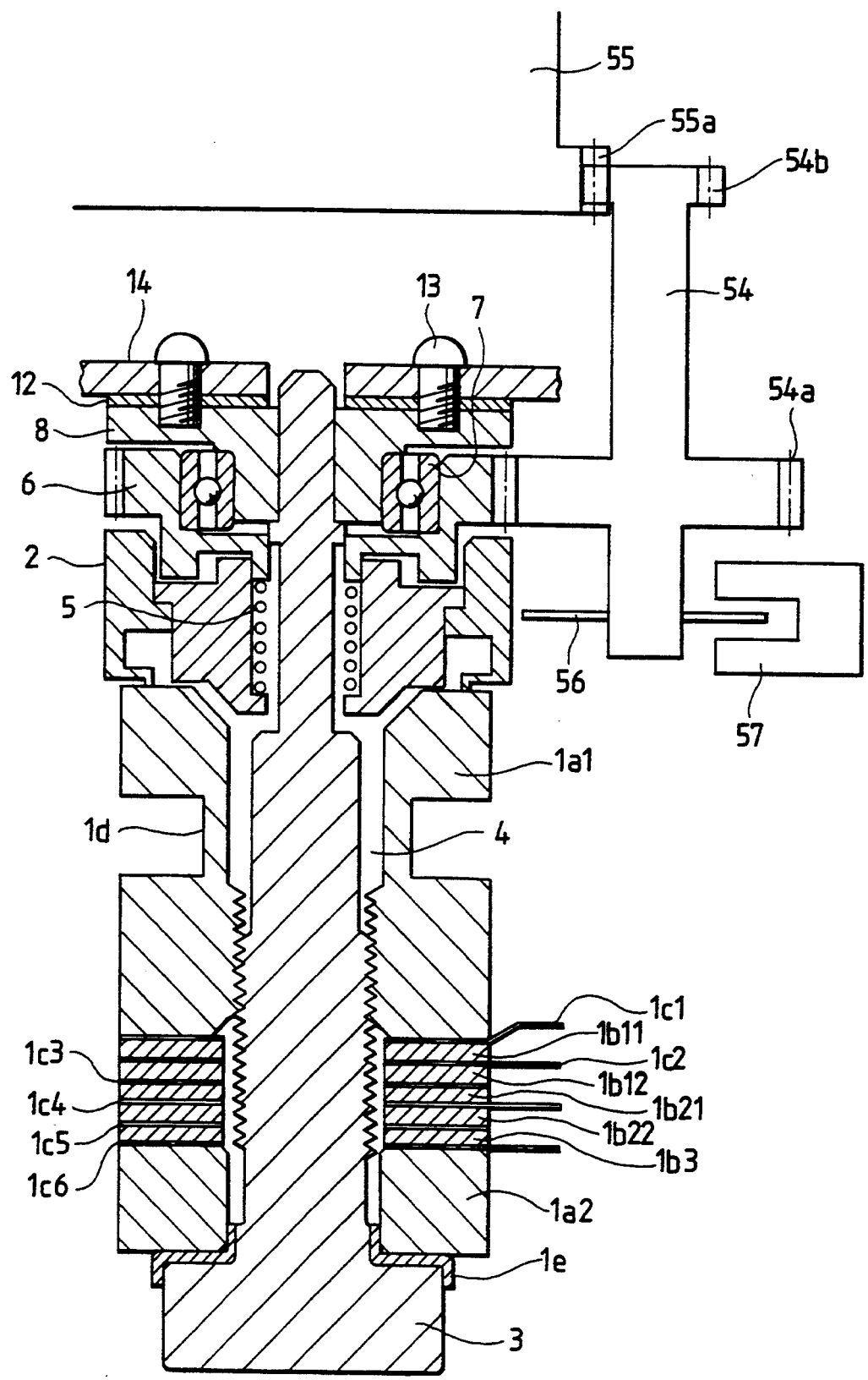
FIG. 9 is a sectional view showing principal parts of an embodiment of a camera system adopting the present invention.

FIG. 9 is a schematic view of a driving apparatus (e.g., a camera system) which uses a bar-shaped vibration driven motor according to the present invention, e.g., a vibration driven motor of the first embodiment as a driving source.

A coupling gear 54 has a large gear portion 54a and a small gear portion 54b. A gear portion formed on the outer circumferential portion of the rotary output member 6 of the vibration driven motor is meshed with the large gear portion 54a.

The small gear portion 54b is meshed with a gear portion 55a of a driving portion 55 of, e.g., a lens barrel of a camera, and is rotated by the rotational force of the motor.

An encoder slit plate 56 is fixed to the coupling gear 54, and the rotational speed and rotation angle of the rotor 2 are detected by a photocoupler 57.

As described above, in a vibration member provided with a means for decreasing the rigidity near a contact portion, a coupling member such as a screw coupling portion, an adhesion coupling portion, or the like, which causes a nonuniform rigidity, is not arranged near the low-rigidity portion. For this reason, a variation in natural frequency of the vibration member can be reduced. As a result, a variation $\Delta f$ can also be reduced, and motor performance can be stabilized.

Since a loss at the coupling portion is also reduced, motor efficiency can be improved.

What is claimed is:

1. A vibration driven motor or actuator comprising:
   a first vibration member having a driving surface for relatively moving a contact member, and an amplitude increasing portion for increasing a vibration amplitude on said driving surface;
   a second vibration member;
   an electro-mechanical energy conversion element, clamped between said first and second vibration members, for generating a first bending vibration in a first direction and a second bending vibration in a second direction different from the first direction in at least said first vibration member; and
   a coupling member for integrally coupling said first and second vibration members and said electro-mechanical energy conversion element, the coupling member having a coupling portion coupled to at least one of said first and second vibration members at a position axially separated from said amplitude increasing portion, wherein the amplitude increasing portion and the coupling portion are arranged so as not to overlap in an axial direction of the vibration member.

2. A vibration driven motor or actuator according to claim 1, wherein said amplitude increasing portion has a shape for decreasing a rigidity of said first vibration member.

3. A vibration driven motor or actuator according to claim 2, wherein the coupling portion of said coupling member includes a screw portion coupled to a corresponding screw portion provided on at least one of said first and second vibration members.

4. A vibration driven motor or actuator according to claim 1, wherein said first and second vibration members have a bar shape, and said amplitude increasing portion is formed as a circumferential groove on said first vibration member.

5. A vibration driven motor or actuator according to claim 1, wherein said coupling member further comprises a head portion and an engaging portion, and wherein said coupling portion is coupled to a coupling portion of said first vibration member, for rigidly fastening said first and second vibration members and said electro-mechanical energy conversion element, said head portion is engageable with said second vibration member, and said engaging portion is engageable with a fixing portion provided at a predetermined position.

6. A vibration driven motor or actuator comprising:
a vibration member having a driving surface for relatively moving a contact member;
an electro-mechanical energy conversion element, arranged in contact with said vibration member, for generating a first bending vibration in a first direction and a second bending vibration in a second direction different from the first direction in said vibration member; and
a supporting member having a coupling portion engaged with a coupling portion of said vibration member,
said vibration member having an amplitude increasing portion for increasing a vibration amplitude on said driving surface, at least a portion of the amplitude increasing portion and the coupling portion of said supporting member being arranged so as not to overlap in an axial direction of said vibration member.

7. A vibration driven motor or actuator comprising:
a first vibration member having a driving surface for relatively moving a contact member;
a second vibration member;
an electro-mechanical energy conversion element, clamped between said first and second vibration members, for generating a first bending vibration in a first direction and a second bending vibration in a second direction different from the first direction in at least said first vibration member; and
a coupling member for integrally coupling said first and second vibration members and said electro-mechanical energy conversion element, at least one of said first and second vibration members having an amplitude increasing portion for increasing a vibration amplitude on said driving surface, the coupling member having a coupling portion coupled to at least one of said first and second vibration members at a position axially separated from a position near said amplitude increasing portion, for integrally coupling said first and second vibration members and said electro-mechanical energy conversion elements, wherein the amplitude increasing portion and the coupling portion are arranged so as not to overlap in an axial direction of the vibration member.

8. A vibration driven motor or actuator comprising:
a vibration member having a driving surface for relatively moving a contact member;
an electro-mechanical energy conversion element, pressed against said vibration member, for generating a first bending vibration in a first direction and a second bending vibration in a second direction different from the first direction in said vibration member; and
a coupling member for pressing said vibration member against said electro-mechanical energy conversion element,
said vibration member having an amplitude increasing portion for increasing a vibration amplitude on said driving surface, and
said coupling member having a coupling portion, coupled to said vibration member at a position axially separated from a position near said amplitude increasing portion, for pressing said vibration member against said electro-mechanical energy conversion element, wherein the amplitude increasing portion and the coupling portion are arranged so as not to overlap in an axial direction of the vibration member.

9. A vibration driven motor or actuator according to claim 8, wherein said amplitude increasing portion has a shape for decreasing a rigidity of said vibration member.

10. A vibration driven motor or actuator according to claim 9, wherein the coupling portion of said coupling member includes a screw portion coupled to a corresponding screw portion of said vibration member.

11. A vibration driven motor or actuator according to claim 8, wherein said vibration member has a bar shape having a hollow portion, and said amplitude increasing portion is formed as a circumferential groove on said vibration member.

12. A vibration driven motor or actuator according to claim 11, wherein said coupling member comprises a bolt including said coupling portion, a head portion and an engaging portion, and wherein said bolt is inserted in the hollow portion of said vibration member, said coupling portion is coupled to a coupling portion of said vibration member, for rigidly fastening said vibration member and said electro-mechanical energy conversion element, said head portion is operatively engageable with said electro-mechanical energy conversion element, and said engaging portion is engageable with a fixing portion provided at a predetermined position.

13. A vibration driven motor or actuator according to claim 8, wherein the coupling portion of said coupling member is coupled to said vibration member by adhesion.

14. A vibration driven motor or actuator according to claim 11, wherein said coupling member comprises a bolt including said coupling portion, a stepped portion, a screw portion, and a nut, and wherein said bolt is inserted in the hollow portion of said vibration member, said stepped portion is engaged with a corresponding stepped portion formed on an inner surface of said vibration member, which surface defines said hollow portion, and said nut is arranged on a side of said electro-mechanical energy conversion member opposite said vibration member, to sandwich said electro-mechanical energy conversion element therebetween, and is engaged with said screw portion of said bolt.

15. A vibration driven system comprising:

a vibration member having a driving surface for actuating a movable member;

an electro-mechanical energy conversion element, pressed against said vibration member, for generating a first bending vibration in a first direction and a second bending vibration in a second direction different from the first direction in said vibration member;

a coupling member for pressing said vibration member against said electro-mechanical energy conversion element, said vibration member having an amplitude increasing portion for increasing a vibration amplitude on said driving surface, and the coupling member having a coupling portion, coupled to said vibration member at a position axially separated from a position near said amplitude increasing portion, for pressing said vibration member against said electro-mechanical energy conversion element, wherein the amplitude increasing portion and the coupling portion are arranged so as not to overlap in an axial direction of the vibration member; and a driving force transmitting member for moving a load of said system upon rotation of said movable member.

16. A vibration driven motor or actuator comprising:

a vibration member having a driving surface for relatively driving a contact member;

an electro-mechanical energy conversion element, pressed against said vibration member, for generating a first bending vibration in a first direction and a second bending vibration in a second direction different from the first direction in said vibration member; and a coupling member for pressing said vibration member against said electro-mechanical energy conversion element, said vibration member having an amplitude increasing portion for increasing a vibration amplitude on said driving surface, wherein the amplitude increasing portion and the coupling portion are arranged so as not to overlap in an axial direction of the vibration member, and the coupling member sets rigidities of said vibration member in the first and second directions to be equal to or substantially equal to each other.

* * * * *

UNITED STATES PATENT AND TRADEMARK OFFICE
CERTIFICATE OF CORRECTION

PATENT NO. : 5,387,835
DATED : February 7, 1995
INVENTOR(S) : Tsukimoto, et al.

It is certified that error appears in the above-indentified patent and that said Letters Patent is hereby corrected as shown below:

COLUMN 2

Line 45, "that" should read --that,--.

COLUMN 3

Line 38, "other" should read --other.--.

COLUMN 8

Line 5, "elements," should read --element,--.

Signed and Sealed this

Second Day of May, 1995

BRUCE LEHMAN

Attest:

*Attesting Officer*  *Commissioner of Patents and Trademarks*